United States Patent [19]

Stormbom et al.

[11] Patent Number: 4,924,064
[45] Date of Patent: May 8, 1990

[54] METHOD FOR TRIMMING A PLANAR CAPACITOR

[75] Inventors: Lars Stormbom; Jouko Jalava, both of Vantaa; Heikki Mesiä ; Ari Lehto, both of Helsinki; Pekka Belt, Vantaa, all of Finland

[73] Assignee: Vaisala Oy, Helsinki, Finland

[21] Appl. No.: 291,225

[22] Filed: Dec. 28, 1988

[30] Foreign Application Priority Data

Dec. 30, 1987 [FI] Finland .................................. 875769

[51] Int. Cl.$^5$ ............................................. B23K 26/00
[52] U.S. Cl. ........................... 219/121.69; 219/121.85; 361/305
[58] Field of Search ...................... 219/121.68, 121.69, 219/121.6, 121.85; 338/195; 361/305, 529

[56] References Cited

U.S. PATENT DOCUMENTS 3,483,451 12/1969 Klerer ................................. 361/305
4,217,570 8/1980 Holmes ...................... 219/121.69 X
4,439,814 3/1984 Rhodes ........................... 338/195 X
4,792,779 12/1988 Pond et al. ................. 219/121.69 X Primary Examiner—C. L. Albritton

[57] ABSTRACT

This invention concerns a method for trimming a planar capacitor. According to the method, a laser emission is focused to an electrode of a capacitor formed on a substrate transparent to laser emission and including of an upper electrode, an insulation layer, and a lower electrode, in order to achieve a passivation effect on the electrode. The laser emission is focused according to the invention locally onto the lower electrode through the substrate in order to achieve a heating effect on the lower electrode, thereby oxidizing the electrode material so that the lower electrode is locally converted into an electrically nonconductive state while being protected by the substrate and the insulation layer. The trimming method in accordance with the invention is accurate and offers a stable capacitance value.

3 Claims, 1 Drawing Sheet

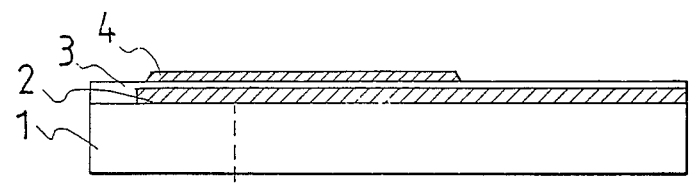
Fig.1
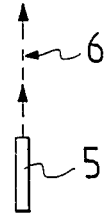
Fig.2
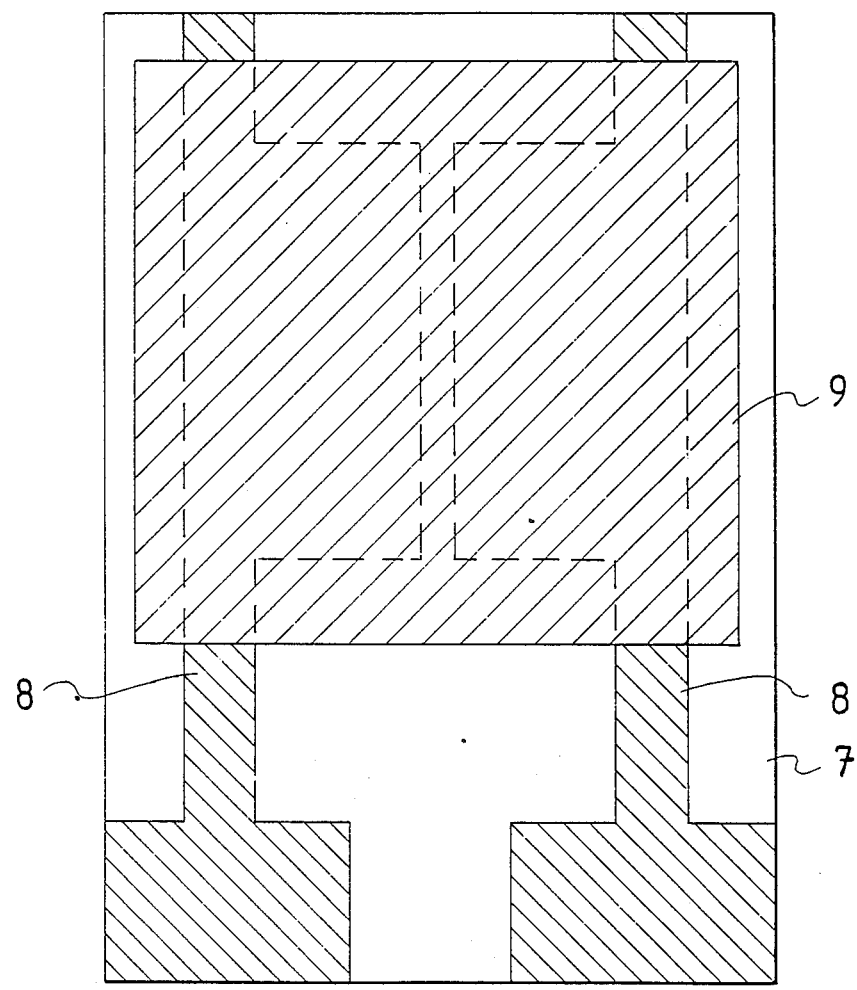

METHOD FOR TRIMMING A PLANAR CAPACITOR

BACKGROUND OF THE INVENTION

1. Field of the Invention

The present invention relates to a method for trimming a planar capacitor. More particularly, the present invention relates to a method for trimming a planar capacitor in which method a laser emission is focussed to an electrode of a capacitor formed on a substrate transparent to laser emission and including an upper electrode, an insulation layer, and a lower electrode in order to achieve a passivation effect on the electrode.

2. Description of Related Art

Known from U.S. Pat. No. 3 597 579 is a trimming method for capacitors, in which method the area of the capacitor electrode is altered by the use of radiation energy and, in the interest of avoiding the occurrence of short circuits, a voltage is applied between the capacitor electrodes.

A disadvantage of conventional technology is that the above described method is applicable only to a restricted selection of materials. The trimming operation is performed on the upper capacitor electrode thus leaving the trimmed area subject to contamination and degradation particularly when the sensor is used in a humid environment.

SUMMARY OF THE INVENTION

The aim of the present invention is to overcome the drawbacks of the aforementioned prior art technology and to provide a completely novel method for trimming a planar capacitor.

The invention is based on trimming the capacitor by oxidizing the lower electrode by heating the electrode through the substrate using, for example, a laser.

More specifically, the method in accordance with the invention is characterized by a laser emission being focussed locally onto the lower electrode through the substrate in order to achieve a heating effect on the lower electrode, thereby oxidizing the electrode material so that the lower electrode is locally converted into an electrically non-conductive state while being protected by the substrate and the insulation layer.

The invention is significantly beneficial because the capacitor can be accurately trimmed to a desired capacitance value, and this value will stay stable, since the lower electrode remains protected under the insulation layer.

In the following, the invention will be examined in more detail by means of the exemplifying embodiments in accordance with the attached drawings.

BRIEF DESCRIPTION OF THE DRAWINGS

FIG. 1 shows a longitudinally sectional side view of a typical capacitor construction, which is processed using the method according to the present invention; and FIG. 2 shows a bottom view of another typical capacitor construction, which is compatible with the use of the method according to the present invention.

DETAILED DESCRIPTION OF PREFERRED EMBODIMENTS

According to FIG. 1, the capacitor comprises a substrate 1, which generally is of glass. Alternatively, other substrate materials transparent to laser emission may be used. Fabricated on the substrate 1 is a lower electrode 2, whose material can be of, for example, aluminium. Next covering the lower electrode is an insulation layer 3, which in a humidity sensor construction, is made of a suitable water absorbing polymer. Deposited on the insulation layer 3 is an upper electrode 4, which in a humidity sensor construction is fabricated from a humidity-permeable material. Capacitor trimming is achieved by focusing a beam 6 of a laser 5 through the substrate 1 onto the lower electrode 2, thereby heating the lower electrode locally by the beam 6, which leads to an oxidation of the lower electrode 2 into an electrically nonconductive state. In this method the active area of the capacitor is reduced and the capacitance decreased to a desired value. The laser 5 may be, for example, a Q-switched Nd:YAG laser, whereby a proper drive current is, for example, 20 A.

Alternatively, the lower electrode 2 may be fabricated from tantalum.

A capacitor according to FIG. 2 has lower electrodes 8, covered by an insulation layer (not shown) vapor deposited on the glass substrate 7. A surface electrode 9 is further plated onto the insulation layer. The oxidation process described above in conjunction with FIG. 1 is carried out over the lower electrode area which, according to FIG. 2 remains below the surface electrode 9.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for trimming a planar capacitor, comprising the steps of:
   (a) providing a substrate transparent to laser emission;
   (b) providing a capacitor on an upper planar surface of said substrate, said capacitor including an upper electrode, an insulation layer, and a lower electrode;
   (c) locally focussing a laser emission on said lower electrode of said capacitor through said substrate, thereby achieving a local heating effect on said lower electrode, wherein said step of locally focussing a laser emission is with a power density for rapidly oxidizing said lower electrode by dissolving gaseous oxygen in the insulation layer, thereby preventing vaporization of said lower electrode layer; and
   (d) locally converting said lower electrode into an electrically non-conductive state according to step (c), wherein the integrity of each of said substrate and said insulation layer are maintained.

2. The method according to claim 1, wherein the oxidizable lower electrode is formed of aluminum.

3. The method according to claim 1, wherein the oxidizable lower electrode is formed of tantalum.

* * * * *